United States Patent [19]

Welch

[11] Patent Number: 4,473,316

[45] Date of Patent: Sep. 25, 1984

[54] FASTENER CLIP AND JOINT STRUCTURE

[75] Inventor: Montgomery J. Welch, Spring Lake, Mich.

[73] Assignee: Modular Systems, Inc., Fruitport, Mich.

[21] Appl. No.: 376,428

[22] Filed: May 10, 1982

[51] Int. Cl.³ ............................ B25G 3/00; F16B 9/00
[52] U.S. Cl. .................................... 403/246; 403/353; 403/407; 248/222.4; 5/299
[58] Field of Search ............... 403/407, 353, 405, 406, 403/254, 255, 245, 246; 248/222.4, 223.1, 223.2, 248; 52/584; 5/299, 296

[56] References Cited

U.S. PATENT DOCUMENTS

| | | |
|---|---|---|
| 1,351,119 | 8/1920 | Ogden . |
| 1,533,724 | 4/1925 | Clarke-James . |
| 1,940,969 | 12/1933 | Randall . |
| 2,245,751 | 6/1941 | Blackmore . |
| 2,278,708 | 4/1942 | Miller . |
| 2,708,292 | 5/1955 | Budai . |
| 2,882,110 | 4/1959 | Mutchnik . |
| 3,159,440 | 12/1964 | Courtwright . |
| 3,178,775 | 4/1965 | Tassell . |
| 3,178,987 | 4/1965 | Reese et al. . |
| 3,239,988 | 3/1966 | Meyer . |
| 3,270,995 | 9/1966 | Shears . |
| 3,288,192 | 11/1966 | Bollinger . |
| 3,297,916 | 1/1967 | Wright . |
| 3,430,674 | 3/1969 | Forbush . |
| 3,451,362 | 6/1969 | Ostling et al. . |
| 3,491,820 | 1/1970 | Ostling . |
| 3,634,983 | 1/1972 | Welch . |
| 3,645,162 | 2/1972 | Welch . |
| 3,755,979 | 9/1973 | Pantazi . |
| 3,894,377 | 7/1975 | Welch . |
| 3,996,718 | 12/1976 | Welch . |
| 4,178,047 | 12/1979 | Welch . |

FOREIGN PATENT DOCUMENTS

| | | |
|---|---|---|
| 18875 | 1/1905 | Austria . |
| 163663 | 7/1949 | Austria . |
| 712235 | 7/1968 | Belgium . |
| 007397 | 5/1979 | European Pat. Off. ............ 403/407 |
| 921406 | 12/1954 | Fed. Rep. of Germany . |
| 1349422 | 12/1954 | France . |
| 1399609 | 4/1965 | France . |
| 380908 | 9/1964 | Switzerland . |

OTHER PUBLICATIONS

Catalog p. 56, Selby Furniture Hardware Company, "Knockdown Fitting".
Furniture Production Magazine, Aug. 1968, p. 59.
Furniture Methods & Materials, Apr. 1976, p. 21.
Catalog, Hafele KG, Nagold, W. German, Feb. 1980, "Bed Fittings".
Publication-MOD-EEZ-Flexible Joint Structural Fastening System, Modular Systems, Inc., Aug. 1980.

Primary Examiner—Andrew V. Kundrat
Attorney, Agent, or Firm—Price, Heneveld, Huizenga & Cooper

[57] ABSTRACT

A fastener clip and joint structure incorporating same especially adapted for use with thin or narrow furniture parts, panels, or the like to reduce splitting or fracture of the parts when joined and/or stressed. The clip is formed from a one-piece metal plate, preferably of annealed spring steel for flexibility, having a raised, central, slotted portion and a pair of end flanges for securing the clip to one joint member. One end flange extends outwardly away from the central portion while the other extends under the central portion. A stud on an opposite joint member is slid along an inclined slot in the central portion to draw the joint members together. In one embodiment, an enlarged opening in the slot allows access through the slot to the end flange beneath the slot for fastening the flange to the joint member.

13 Claims, 7 Drawing Figures

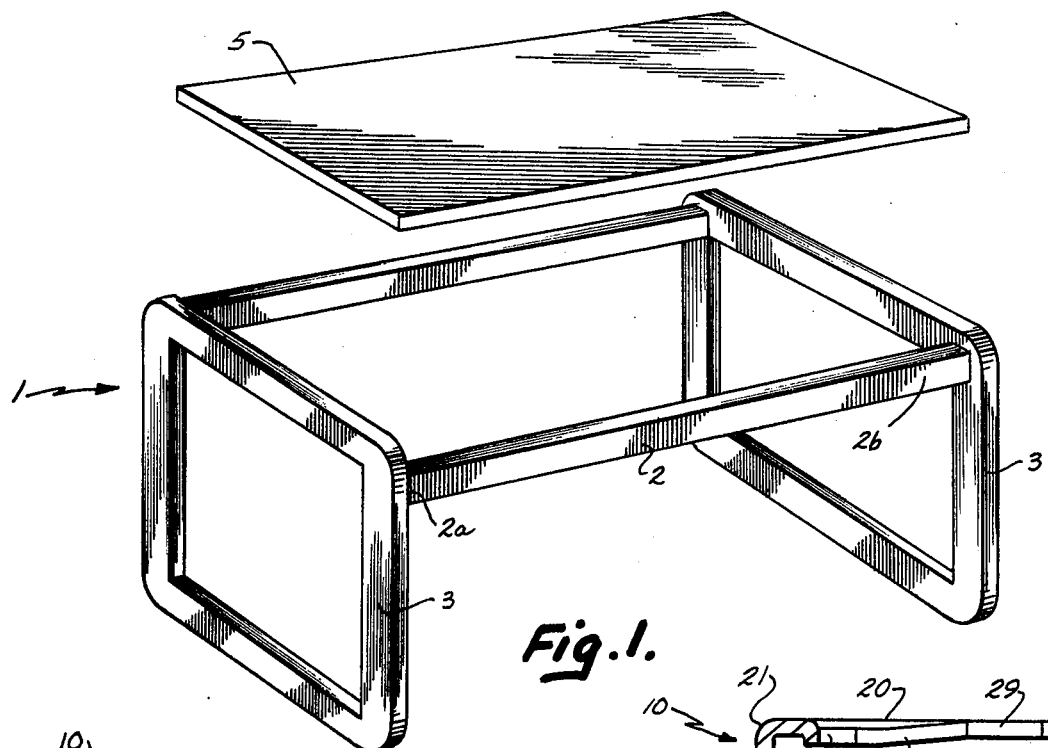

FASTENER CLIP AND JOINT STRUCTURE

BACKGROUND OF THE INVENTION

This invention relates to joint structures for furniture, phone booths, room space dividing panels, decorative panels, frames and the like, as well as to flexible fastening clips therefor.

Many joints, such as between modern furniture parts, are now fastened together by concealed mechanical connectors. Many of these concealed fasteners employ keyhole slots and stud like fasteners. Generally, this type of furniture fastening system includes short recessed areas along the edges of furniture members to be joined together. Fasteners or clips are mounted within the recessed areas of one furniture piece and studs are mounted on the other. The fasteners engage the heads of these studs in a keyhole slot, then seat the stud to firmly engage the separate furniture members. Examples of such fasteners and furniture fastening systems are U.S. Pat. No. 3,491,820 invented by E. J. Ostling, entitled FLEXIBLE JOINT STRUCTURE AND CLIPS THEREFOR and U.S. Pat. No. 3,996,718 invented by R. M. Welch entitled FASTENING APPARATUS FOR PANELS.

Fasteners of the type described above function very well but are limited to applications making use of furniture parts which are large enough to have a surface area sufficient to attach the fastener clip. It is desirable that these clips be concealed to provide a finished appearance to the piece of furniture so constructed. Such concealment requires the fastener clip, when seated within the recess on the furniture part, to be surrounded by a lip two or three sides thereby reducing the surface area available for affixing a clip. Further, since such fastener clips are normally attached to the furniture part by two screws, if the screws which fix the clip to the furniture piece are located too near to the edge of the furniture piece, the furniture will fracture or split and the joint will fail. Although the clip flanges which carry the screws can be reduced in size, it is necessary that sufficient space be left between the concealing lip and the slot entrance to accommodate the stud head and allow it to enter the clip. Such considerations limit the amount these flanges can effectively be reduced in size.

SUMMARY OF THE INVENTION

Therefore, the present invention provides an improved fastener clip and joint structure incorporating same. The clip can be used for applications in which other fastener clips would either split the furniture piece to which it is affixed, or prevent concealment of the clip. The clip is also stronger and thus provides stronger joints than prior known clips.

In one embodiment, the invention provides a clip which can be affixed using tools and screws used for present fastener clips. More specifically, the invention is a clip for use in a joint structure. The clip is made from a metal plate or sheet metal and has two flanges located in a different plane than a central section. A slot is formed in the central section for receiving a stud or enlarged head of a screw when the joint structure is assembled. Each flange is integrally joined to the central portion by an upright portion, so that the two upright portions space the flanges from the central portion and define a space or gap beneath the central portion for receiving the stud or screw head. One flange extends outwardly from its connecting upright portion and lies outside the central portion. The second flange extends inwardly from its connecting upright portion and lies beneath the central portion.

Preferably, the slot is tapered and inclined, and opens out into an enlarged aperture that is located directly above the inward extending flange. This aperture does not extend for the entirety of the slot, so that studs as presently manufactured will still engage and be secured within the central portion when fitted into the slot. The aperture allows standard screws to be used to affix the clip, since the aperture will allow passage of a screw through the central portion. Additionally, the aperture allows tools such as screw driver blades, which are wider than the slot, to be used to mount the clip. Further, the concealing lip of the furniture piece can abut the fastener clip, since the head of the stud on the opposite furniture piece can enter the slot through the aperture, without the previously required additional space adjacent the clip.

BRIEF DESCRIPTION OF THE DRAWINGS

FIG. 1 is a perspective view of a representative piece of furniture embodying the joint structure of the present invention;

FIG. 2 is a top plan view of a fastener clip embodying the present invention;

FIG. 3 is a side sectional view taken along line II—II of FIG. 2 of the present invention;

FIG. 4 is an end elevational view of the clip shown in FIGS. 2 and 3 and embodying the present invention;

FIG. 5 is a perspective view of the clip shown in FIGS. 2-4 and embodying the present invention;

FIG. 6 is a fragmentary, side sectional view of one joint structure incorporating the clip of FIGS. 2-5 and embodying the present invention; and FIG. 7 is a fragmentary, side elevational view of another joint structure incorporating the clip of FIGS. 2-5 embodying the present invention.

DETAILED DESCRIPTION OF THE PREFERRED EMBODIMENT

FIG. 1 illustrates a furniture assembly 1 embodying the joint structure of the present invention. A furniture piece or first panel 2, in this case a rail, is connected between two end support legs 3. In either end 2a and 2b of rail 2 are recesses surrounded on at least two sides by a lip shown in phantom in FIG. 2. A clip, such as that shown in FIGS. 2-5, is affixed within each recess and a stud is connected to each end support 3. Each clip engages a stud and holds the rail 2 in contact with the support 3, concealing both the clip and the stud, in the manner shown in FIG. 6. The rails may include recessed areas along their upper edges (not shown) for receiving a glass or other table top or panel 5 in the conventionally known manner.

As shown in FIGS. 2-5, clip 10 has end flanges 11 and 12 which lie in a common plane, flange 11 having a screw receiving hole 13 and flange 12 having a screw receiving hole 14. The clip has a generally raised central portion 20 lying generally in another plane spaced from that of flanges 11, 12 and joined to an upstanding end wall 15 at one end and to spaced, upstanding legs 16, 17 at the other end. End flange 12 joins the bottom portion of end wall 15. Upstanding legs 16 and 17 are formed integrally with an upstanding wall portion 18 which is joined to end flange 11. A top wall 20 is formed between the upstanding end wall 15 and upstanding legs 16, 17. A corner 21 is formed between central portion or top wall 20 and upstanding end wall 15. A corner 22 is formed between upstanding leg 16 and top wall 20. Still another corner 23 is formed between upstanding leg 17 and top wall 20.

A stud head receiving space or gap 19 is defined between the end of end wall 15 which is attached to flange 12 and the end of upstanding wall portion 18 which is attached to flange 11. End flange 12 extends outwardly from end wall 15 in a plane generally parallel to the plane of top wall 20 so that end flange 12 does not extend into the gap 19. End flange 11 extends inwardly from upstanding wall portion 18 and is also in the plane of flange 12 which is generally parallel to the plane of top wall 20. Therefore, end flange 11 extends into gap 19 and is located beneath the top wall 20.

A slot 24 is formed in part by upstanding legs 16 and 17 thus beginning above end wall 18. This slot 24 extends into the central portion of top wall 20 terminates near corner 21 and wall 15. Slot 24 is defined by the top of upstanding wall portion 18, the inside edge of end leg 16, closed end receiving portion 25, inclined wedging flanges 26 and 27, and the inside edge of upstanding leg 17.

The outer open portion of the slot 24 in the top surface 20 has a downwardly extending wedge portion formed by inclined wedging flanges 26 and 27. The wedging surfaces slope downwardly toward the plane of flanges 11 and 12 from the open end to the closed end 25 of slot 24. The closed end receiving portion 25 is parallel to, but spaced downwardly from top wall 30.

In a preferred embodiment of the invention, top wall 20 has an aperture 28 which is a widened portion of and communicative with slot 24. Aperture 28 is formed by outwardly curved edge portions 29 of slot 24. Aperture 28 is located close to corners 22 and 23 on top wall 20 and does not extend for the full length of slot 24, so that it is removed or spaced from end receiving portion 25. Aperture 28 is located in registry with and aligned with hole 13, i.e., is directly above inwardly extending end flange 11 and is centered over flange hole 13. Also, slot 24 narrows or tapers inwardly toward closed end 25 from aperture 28 to confine the securing stud therein and prevent looseness of slop in the ultimate joint.

The joint structure of the preferred embodiment includes clip 10, a first panel such as rail 2 in FIG. 1 and a second panel such as end panel or leg 3 in FIG. 1. Although furniture panels 2 and 3 are preferably wood panels, the joint structure of the present invention can include panels which are formed from metal. Slot 32 is cut in end edge 2a of first panel 2, in which is positioned clip 10. Lip 35 (FIGS. 2 and 6) conceals clip 10 from the sides when the joint is assembled. Wood screws 33 and 34 are used to attach clip 10 to first panel 2, with wood screw 33 first being passed through aperture 28 and then being received in flange hole 13 as shown in FIG. 6. Aperture 28 is of sufficient size to accommodate the blade of a screw driver or other tool being used to drive wood screw 33 into first panel 2.

A shouldered wood screw or stud 40 is fixed in the side of the second panel 31. Screw 40 has a head 41 spaced from a shoulder 42. Head 41 has means (not shown), such as a slot, for receiving the blade of a screw driver so that the screw 40 may be easily fastened in second panel 31. Shoulder 42 contacts the surface into which screw 40 is driven to precisely space head 41 a predetermined distance from that surface and thus allow proper engagement with clip 10 as set forth hereinafter. The space between head 41 and shoulder 42 receives the thickness of the metal of clip 10.

The two panels are securely fastened together by inserting head 41 in the open end of slot 24 either between legs 16, 17 or within aperture 28. First panel 2 is then forced downwardly relative to the second panel 3 as seen in FIG. 6. Curved surfaces 29 cause head 41 to be centered in slot 24 and facilitate assembly of the joint. This movement of the panels will cause screw 40 to slide along wedging surfaces 26 and 27 to draw the head 41 of screw 40 into slot 24 until stud 40 is received in closed end receiving portion 25. The inclination of wedging flanges 26 and 27 causes first and second panels 2 and 3 to be pulled tightly together.

In the event that the joint structure is used on panels which are sufficiently small that concealing lip 35 completely surrounds slot 32 and contacts or is located closely to end legs 16 and 17 (see dotted line w in FIG. 6), the above joint structure can be assembled by moving first panel 30 laterally as seen in FIG. 6 so that head 41 of stud 40 is received in aperture 28. First panel 30 is then forced downward as described above to seat stud 40. In the alternative, as shown in FIG. 7, clip 10 can be affixed to second panel 3 and stud 40 is fixed in slot 32, with the joint structure being assembled as described above.

The flexible nature of the clip is illustrated in FIGS. 6 and 7. The weakest portions of the clip are corners 22 and 23. Accordingly, as the force between screw 40 and clip 10 increases, the top wall 20 will tend to bow outwardly as shown in FIGS. 6 and 7. The dotted lines of FIGS. 6 and 7 show the normal portion. During this bowing operation, the corners 22 and 23 will give and legs 16 and 17 will flex inwardly. Since upstanding wall 15 and corner 21 are solid members and of a greater width than the total width of upstanding legs 16 and 17, there will be substantially no flexibility of the clip at corner 21 or at upstanding end wall 15. This is a desirable condition since the major load and the strength of the clip resides to a great extent in upstanding end wall 15 and corner 21. Thus, the flexibility of the clip is most remotely spaced from the area of greatest stress where screw 40 resides in the assembled joint.

The flexible clip of the invention provides a strong clip to securely fasten together joints such as furniture joints. The clip provides sufficient flexibility, however, to permit expansion and contraction of the wood members themselves without losing the securely fastened nature of the joints. In normal clips, wherein little or no flexibility is present, the screw can be pulled out of the wood during wood swelling or the joint can become very loose during wood drying.

In addition to the above flexibility of the present invention, clip 10 actually has greater joint strength than prior known clips since fastener 33 is closer to the final position of stud 40 in the assembled joint. Thus, support in the present clip is more directly positioned with respect to the area of greatest strength.

In some applications first and second panels 2 and 3 can be metal panels, to which clip 10 and stud 40 are attached by metal screws, spot welding or other methods. Additional descriptions of clips and joint structures of this general nature are contained within U.S. Pat. No. 3,491,820 invented by E. J. Ostling and issued Jan. 27, 1970, the descriptions of which are incorporated herein by reference.

As described above the invention provides a clip which can be used in joint structures having very narrow panels or rails. The preferred embodiment of clip 10 has an overall length of 1.50 inches, an overall height of 0.356 inches, a spacing of the centers of securing holes 13, 14 of 1.05 inches and is formed from AISI C-1050 annealed spring steel having a thickness of 0.05 inches ±0.002. This preferred clip 10 can be used on furniture pieces having clip mounting areas 2½ inches long and less with causing splitting. Clip 10 can be affixed to furniture pieces using present tools and wood screws as aperture 18 will accommodate the passage of these objects, and also will accommodate the head of a shoulder screw in the event that the concealing lip of a furniture piece abuts clip 10 and blocks ingress to the open end of slot 24. As mentioned above, clip 10 is made of a strong resilient material, such as spring steel, to allow the clip to flex and provide a yielding force to the stud as the stud is forced into its seated position.

Clip 10 is cut from a flat blank of sheet metal material in which are cut or stamped slot 24 and holes 13 and 14. The flat material or plate is then bent into the above described configuration. Preferably wedge flanges 26, 27 slope at an angle of 8°.

It is understood that the above description and drawings are of the preferred embodiment and various changes or modifications can be made without departing from the spirit of the invention embodied therein, such as the use of different materials or a different method of attaching the clip to the furniture panels. Therefore, it will be understood that the embodiments shown in the drawings and above description are not intended to limit the scope of the invention which is defined by the claims which follow.

The embodiments of the invention in which an exclusive property or privilege is claimed are defined as follows:

1. A clip for use in a joint structure comprising:
   a one-piece metal plate having first and second end flanges for mounting said clip in a joint structure, a central portion generally in a plane spaced from the general plane of either of said end flanges and joined to said first end flange at one end thereof through a first wall member and to said second end flange at the other end thereof through a second wall member, said first and second wall members defining a gap disposed below said central portion, said first end flange extending outwardly of said first wall member away from said gap, said second end flange extending inwardly from said second wall member so as to extend into said gap and having securing means for securing said second end flange to a support surface, said securing means being located within said gap on said second end flange;
   a slot formed in said central portion, said slot having a closed end and an open end allowing access for a stud, said closed end being at a point intermediate the ends of said central portion;
   wedging surfaces at opposite sides of said slot, said wedging surfaces being inclined downwardly from a point near said open end toward said closed end; and
   whereby a stud having a head larger than said slot and positioned within said slot will be drawn downwardly toward the planes of said end flanges as said stud is moved relative to said clip in a direction from said open end to said closed end.

2. A clip according to claim 1, wherein said central portion defines an enlarged aperture communicative with said slot and disposed directly above said securing means on said second end flange, said aperture not encompassing the entirety of said slot, so as to allow objects to pass through said aperture having a cross sectional area greater than the cross sectional area of objects which can pass through said slot.

3. A clip as described in claim 2, wherein said second wall member includes a pair of spaced, upstanding legs forming an opening therebetween and a solid wall portion extending upwardly from said second end flange and joining said second end flange to said spaced upstanding legs, said solid wall portion extending above said second flange a sufficient distance to provide substantial strength between said wall portion and said second end flange; said open end of said slot extending to and communicating with said opening between said legs.

4. A clip as described in claim 3, wherein said clip is made of a strong, resilient material so as to flex and provide a yielding force to said stud as said stud is forced into said slot.

5. A joint structure comprising:
   a first panel member and a second panel member having surfaces in contacting relationship;
   said first panel member having a recessed area along a surface in contact with said second panel;
   a clip comprising a one-piece metal plate having first and second end flanges, a central portion generally in a plane spaced from the general plane of either of said end flanges and joined to said first end flange at one end thereof through a first wall member and to said second end flange at the other end thereof through a second wall member, said first and second wall members defining a gap disposed below said central portion, said first end flange extending outwardly of said first wall member away from said gap, and said second end flange extending inwardly from said second wall member so as to extend into said gap; a slot formed in said central portion, said slot having a closed end and an open end allowing access for a stud, said closed end being at a point intermediate the ends of said central portion; wedging surfaces at opposite sides of said slot, said wedging surfaces being inclined downwardly from a point near said open end toward said closed end; whereby a stud having a head larger than said slot and positioned within said slot will be drawn downwardly toward the planes of said end flanges as said stud is moved relative to said clip in a direction from said open end to said closed end;
   said clip fastened in said recessed area with said first and second flanges being fastened to the bottom of said recess and said central portion being spaced above the bottom of said recess in close proximity to but below the plane of said surface in contact with said second panel; and
   a stud member fixed in said second panel said stud having an enlarged head extending above and spaced from a surface in contact with said first panel member and juxtaposed to said recessed area of said first panel member, said stud enlarged head being positioned beneath said central portion within said slot so as to strongly and yieldingly hold said first and second panel members in contact with each other.

6. A joint structure as described in claim 5, wherein said central portion of said clip defines an aperture communicative with said slot and is disposed directly above said second end flange, said aperture not encompassing the entirety of said slot.

7. A joint structure comprising:
a first panel member and a second panel member having surfaces in contacting relationship;
said first panel member having a recessed area along a surface and in contact with said second panel;
a clip comprising a one-piece metal plate having first and second end flanges, a central portion generally in a plane spaced from the general plane of either of said end flanges and joined to said first end flange at one end thereof through a first wall member and to said second end flange at the other end thereof through a second wall member, said first and second wall members defining a gap disposed below said central portion, said first end flange extending outwardly of said first wall member away from said gap, and said second end flange extending inwardly from said second wall member so as to extend into said gap; a slot formed in said central portion, said slot having a closed end and an open end allowing access for a stud, said closed end being at a point intermediate the ends of said central portion; wedging surfaces at opposite sides of said slot, said wedging surfaces being inclined downwardly from a point near said open end toward said closed end; whereby a stud having a head larger than said slot and positioned within said slot will be drawn downwardly toward the planes of said end flanges as said stud is moved relative to said clip in a direction from said open end to said closed end;
said clip fastened to said second panel with said first and second flanges being fastened to said second panel member and said central portion extending into said recess area in close proximity to but not in contact with the bottom of said recess; and
a stud member fixed in said recessed area, said stud having an enlarged head extending above and spaced from the bottom of said recess, said stud enlarged head being positioned beneath said central portion within said slot so as to strongly and yieldingly hold said first and second panel members in contact with each other.

8. A joint structure as described in claim 7, wherein said central portion of said clip defines an aperture communicative with said slot and is disposed directly above said second end flange, said aperture not encompassing the entirety of said slot.

9. A method of use of a clip for a joint structure, comprising:
providing a first panel member having a recessed area along a surface;
providing a second panel member having a contact surface;
providing a clip comprising a one-piece metal plate having first and second end flanges, a central portion generally in a plane spaced from the general plane of either of said end flanges and joined to said first end flange at one end thereof through a first wall member and to said second end flange at the other end thereof through a second wall member, said first and second wall members defining a gap disposed below said central portion, said first end flange extending outwardly of said first wall member away from said gap, and said second end flange extending inwardly from said second wall member so as to extend into said gap; a slot formed in said central portion, said slot having a closed end and an open end allowing access for a stud, said closed end being at a point intermediate the ends of said central portion; wedging surfaces at opposite sides of said slot, said wedging surfaces being inclined downwardly from a point near said open end toward said closed end; whereby a stud having a head larger than said slot and positioned within said slot will be drawn downwardly toward the planes of said end flanges as said stud is moved relative to said clip in a direction from said open end to said closed end;
affixing said first and second flanges of said clip to at least one of the bottom of said recess of said first panel and said contact surface of said second panel so that said central portion is spaced above the bottom of said recess in close proximity to but below the plane of said surface or above said contact surface;
providing a stud member having an enlarged head;
affixing said stud member in the other of said recess of said first panel and said contact surface of said second panel so that said enlarged head extends above and is spaced from said recess bottom or said contact surface; and
positioning said stud head in said slot and moving said panel members with respect to one another until said enlarged head of said stud is seated in abutment with the closed end of said slot.

10. A clip for use in a joint structure comprising:
a one-piece metal plate having first and second end flange means for securing a clip to a joint surface;
a central, slotted means for slidably securing the enlarged head of a stud therein;
said central, slotted means being integrally joined to but spaced from said end flange means such that said end flange means lie in at least one plane spaced from said central slotted means to define a space below said central, slotted means for receiving the head of a securing stud;
said first end flange means extending outwardly of said central, slotted means away from said space, said second end flange means extending inwardly of and under said central, slotted means and into said space, said second end flange including securing means for securing said second end flange to a support surface, said securing means being located within said space on said second end flange; and
said central, slotted means having a slot with a closed end and an open end allowing access for a stud, and including inclined portions adjacent at least portions of said slot for drawing a stud downwardly toward said flange means when the stud is moved along the slot toward said closed end.

11. The clip of claim 10 including first and second wall means for joining said central, slotted means to said first and second end flange means, respectively; said wall means being located at either end of said central, slotted means.

12. The clip of claim 11 wherein said slot tapers from adjacent said open end to an area adjacent said closed end.

13. The clip of claim 10, 11 or 12 including an enlarged area within said slot and in registry with said securing means on said second end flange means, said enlarged area allowing insertion of a fastener therethrough and into said securing means on said second end flange means as well as a tool for securing said fastener therethrough.

* * * * *